US012340451B2

(12) United States Patent
Sen et al.

(10) Patent No.: US 12,340,451 B2
(45) Date of Patent: *Jun. 24, 2025

(54) SYSTEMS AND METHOD FOR DYNAMIC INSERTION OF ADVERTISEMENTS

(71) Applicant: Adeia Guides Inc., San Jose, CA (US)

(72) Inventors: Susanto Sen, Karnataka (IN); Radhika Dewan, Haryana (IN); Vikram Makam Gupta, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,094

(22) Filed: Jan. 12, 2024

(65) Prior Publication Data
US 2024/0153179 A1 May 9, 2024

Related U.S. Application Data

(63) Continuation of application No. 18/124,400, filed on Mar. 21, 2023, now Pat. No. 11,908,054, which is a continuation of application No. 17/234,443, filed on Apr. 19, 2021, now Pat. No. 11,640,686, which is a continuation of application No. 16/310,887, filed as
(Continued)

(51) Int. Cl.
*G06T 11/60* (2006.01)
*G06T 7/60* (2017.01)
*G06T 7/70* (2017.01)
*G06T 7/90* (2017.01)

(52) U.S. Cl.
CPC .............. *G06T 11/60* (2013.01); *G06T 7/60* (2013.01); *G06T 7/70* (2017.01); *G06T 7/90* (2017.01); *G06T 2207/10016* (2013.01); *G06T 2207/10024* (2013.01)

(58) Field of Classification Search
None
See application file for complete search history.

(56) References Cited

U.S. PATENT DOCUMENTS

| 5,491,517 A | 2/1996 | Kreitman et al. |
| 6,239,794 B1 | 5/2001 | Yuen et al. |
| 6,564,378 B1 | 5/2003 | Satterfield et al. |

(Continued)

FOREIGN PATENT DOCUMENTS

EP 3236655 A1 10/2017

OTHER PUBLICATIONS

Cheng et al., "Color image segementation based on homogram thresholding and region merging," Pattern Recognition, 35(2):373-393 (2002).

(Continued)

*Primary Examiner* — Edward Martello
(74) *Attorney, Agent, or Firm* — Haley Guiliano LLP

(57) ABSTRACT

Systems and methods are described to detect a location to place an advertisement in a media asset, the method comprising, identifying a plurality of points in a video frame of a media asset, detecting a color associated with each point of the plurality of points, calculating a change in color between each point of the plurality of points, comparing the change in color between each point of the plurality of points with a threshold, identifying, based on the comparing, an area within the frame that constitutes a surface; and selecting an advertisement to be placed on the surface.

20 Claims, 7 Drawing Sheets

Related U.S. Application Data application No. PCT/US2017/067983 on Dec. 21, 2017, now Pat. No. 11,010,946.

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 8,488,190 B2 | 7/2013 | Tsunematsu |
| 9,420,353 B1 | 8/2016 | Gargi et al. |
| 10,109,092 B1 | 10/2018 | Hitchings |
| 11,010,946 B2 | 5/2021 | Sen et al. |
| 11,640,686 B2 | 5/2023 | Sen et al. |
| 11,908,054 B2 | 2/2024 | Sen et al. |
| 2002/0027561 A1 | 3/2002 | Wu |
| 2002/0174430 A1 | 11/2002 | Ellis et al. |
| 2005/0251827 A1 | 11/2005 | Ellis et al. |
| 2010/0091139 A1 | 4/2010 | Sako et al. |
| 2010/0153885 A1 | 6/2010 | Yates |
| 2012/0076409 A1* | 3/2012 | Guo .................. G06V 10/752 382/173 |
| 2015/0078733 A1 | 3/2015 | Popkiewicz et al. |
| 2015/0139545 A1* | 5/2015 | Guntur .................. G06T 7/246 382/170 |
| 2016/0212455 A1 | 7/2016 | Manna |
| 2017/0161545 A1 | 6/2017 | Champlin et al. |
| 2017/0278289 A1 | 9/2017 | Marino et al. |
| 2021/0264653 A1 | 8/2021 | Sen et al. |
| 2023/0237721 A1 | 7/2023 | Sen et al. |

OTHER PUBLICATIONS

PCT International Search Report, International Application No. PCT/US2017/067983, May 28, 2018 (16 pages).

Vantaram, et al., "Survey of Contemporary Trends in Color Image Segmentation," Journal of Electronic Imaging, 21 (4):40901-1-28 (2012) (29 pages).

* cited by examiner

SYSTEMS AND METHOD FOR DYNAMIC INSERTION OF ADVERTISEMENTS

CROSS-REFERENCE TO RELATED APPLICATIONS

This application is a continuation of U.S. patent application Ser. No. 18/124,400, filed Mar. 21, 2023, which is a continuation of U.S. patent application Ser. No. 17/234,443, filed Apr. 19, 2021, now U.S. Pat. No. 11,640,686, which is a continuation of U.S. patent application Ser. No. 16/310,887, filed Dec. 18, 2018, now U.S. Pat. No. 11,010,946, which is a national stage application under 35 U.S.C. § 371 of International Application PCT/US2017/067983, filed Dec. 21, 2017, which are hereby incorporated by reference herein in their entireties.

BACKGROUND OF THE INVENTION

An amount of content consumed by viewers has grown exponentially and so have advertisement opportunities. Traditionally, advertisements have been inserted between segments of programs. However, in many situations that is not an optimal approach because viewers are able to change the channel or leave the room in order to avoid viewing the advertisement. Current systems have solved this problem by enabling users to mark spaces (e.g., surfaces) in video frames where advertisements can be inserted later on, thereby solving the problem of users changing channels or leaving the room. However, this process is very time consuming and inefficient because programs have hundreds of thousands of frames. For example, a two-hour movie can have 144,000 frames. Even if it takes a minute to mark up a frame, or even two frames, the time and effort to perform the mark-up is almost prohibitive.

Summary

Accordingly, systems and methods are provided herein for dynamically identifying surface(s) in a video frame suitable for inserting advertisements. For example, a media guidance application associated with a user device (e.g., a set-top box) may be configured to detect an ocean surface in a scene of the movie "Titanic" and may be further programmed to insert an advertisement on the ocean surface while the user is consuming that media asset.

The described method of dynamically inserting advertisements into frames of a media asset may detect a surface in the media asset where an advertisement may be inserted. The detection of the surface enables a media guidance application to insert an advertisement in a location that does not interfere with the content of the scene or diminish the viewing experience of the user in any way.

In some aspects, the media guidance application may identify a location (e.g., a surface) to place an advertisement in a media asset. The media guidance application may select a first plurality of points in a video frame of a media asset. For example, the media guidance application may divide a frame from the movie "Titanic" that is about to be displayed into a plurality of regions based on a predetermined algorithm. Each region may be a square that is adjacent to other regions (other squares) that make up the area of the frame. The media guidance application may identify one or more points that may be inside of each region (e.g., each square) or the points may be at the intersections of the lines that make up each square.

The media guidance application may detect a color associated with each point of the first plurality of points. For example, the media guidance application may determine that a first point from a portion of the frame to be displayed may be "blue" in color and a second point in the frame may be "black" in color. The color of the points may depend on the objects on the screen that the point may be associated with. For example, various parts of the ship "Titanic" may have different colors (e.g., white, yellow, and other suitable colors, while the water, if depicted in the frame, may be blue or a shade of blue).

The various parts of the ship "Titanic" in the video frame may have different colors (e.g., white, yellow, black, and other suitable colors), while the water may be blue or a shade of blue. The ship may have various parts that have different colors. For example, the hull of the ship may be black in color, while the chimney stacks may be yellow and the deck of the ship may be white. The smoke emerging from the chimney stacks may be a shade of gray. The background of the video frame is sky, that may be blue (during the day), black (during the night), or different shades of orange and yellow (during the dawn and dusk). The clouds in the sky may be colored accordingly. Thus, the points associated with the various objects of the video frame 102, may be of different colors.

The media guidance application may process each point on the frame to determine color and surface corresponding to each point. The media guidance application may begin the iteration process by selecting a first point in the first plurality of points. The selection of the point may be based on the iteration process. For example, the media guidance application may start the iteration with a top-right corner and proceed in a clockwise direction. It should be noted that different starting points may be used in this process.

The media guidance application may calculate a distance between the first point and other points in the first plurality of points. For example, the media guidance application may select a first point in a frame of a movie "Titanic" that depicts the ocean as part of the frame". Other points in the first plurality of points may include points directly connected to the first point, or at a certain distance from the first point.

The media guidance application may select a second plurality of points from the other points in the first plurality of points, where the second plurality of points include points within a threshold distance of the first point. For example, within the first plurality of points, the media guidance application may determine points that are within a predetermined threshold distance from the first point. In some examples, the distance may be measured in terms of the number of points between the first point and a second point. Based on the calculation of distance of each point in the first plurality of points from the first point, the media guidance application may determine a second plurality of points that are within the predetermined threshold distance from the first point.

The media guidance application may calculate a change in color between the different selected points. Specifically, the media guidance application may calculate a change in color between the first point and each point of the set second plurality of points. For example, the media guidance application may determine that the first point in the video frame is "blue" in color and that other points in the set of the second plurality of points have a color that is a shade of "blue."

Similarly, the media guidance application may determine that points in the second plurality of points that are within a threshold distance from the first point may be of "blue", "black", or other colors that are a part of the video frame. In some embodiments, the media guidance application may represent colors using predefined encoding mechanisms, like the RGB encoding where each value of the red, blue, and green color ranges from 0 to 255. The media guidance application may calculate a change in color of the points in the second plurality of points from the first point.

The media guidance application may calculate a change in color based on the values of the encoded color. In some embodiments, the media guidance application may determine a change in color by computing a difference in the encoded color values.

The media guidance application may group together the points that are within a predetermined threshold color change. Particularly, the media guidance application may generate, based on the comparing, a subset of points that are within the threshold color change. For example, the media guidance application may group points in the second plurality of points based on the computed color difference between a plurality of points. When the computed difference in the color of the points is less than a predetermined threshold, the point is grouped along with the first point. For example, if the surface being processed is an ocean (e.g., water), the media guidance application may group all points together that constitute a surface of the ocean.

The media guidance application may generate a data structure of a surface using the grouped points. Particularly, the media guidance application may generate, based on the subset of points, a data structure representing a surface. For example, the media guidance application may associate the grouped together points in the second plurality of points to represent a surface.

The media guidance application may select an advertisement to be placed on the identified surface. Particularly, the media guidance application may select, based on the data structure representing the surface, an advertisement of a plurality of advertisements for display with the video frame. For example, the media guidance application may determine, from a set of advertisements, the most suitable advertisement to be placed on the determined surface. For example, if the surface is water (e.g., an ocean), the media guidance application may select a ship and store the ship in memory with an advertisement to be placed on the ship's hull.

The media guidance application may generate the selected advertisement for display. Particularly, the media guidance application may generate for display the advertisement so that it appears on the surface. For example, the media guidance application may display the selected advertisement on an ocean surface determined in a video frame of the movie "Titanic" by the media guidance application, when the particular frame is displayed on the screen of the user device. For example, the media guidance application may generate for display the ship with the advertisement on the ship's hull.

In some embodiments, the media guidance application may select an appropriate advertisement for the surface by determining a type associated with the surface. In some embodiments, the media guidance application may determine a type associated with the surface. For example, the type of the surface may be an object in the video frame like "ocean", "wall", "ship", or "sky".

The media guidance application may compare the type associated with the surface with metadata associated with each advertisement of the plurality of advertisements. For example, the media guidance application may compare the determined type of surface with metadata associated with advertisements in the set of advertisements.

The media guidance application may retrieve an advertisement based on the type of surface. For example, the media guidance application may determine that the type associated with the surface in a frame is "a body of water" or "ocean". The media guidance application may search through the metadata of the available advertisements and select an advertisement that has some relation to the "ocean" or "water". Some examples of advertisements relating to water may be advertisements that contain a water vehicle (e.g., a yacht, jet-ski, boat, ship or another suitable advertisement). Additionally or alternatively, the advertisement may be for an activity relating to water like scuba-diving or snorkeling, etc.

In some embodiments, the media guidance application may determine an object associated with the type of surface before inserting the advertisement. For example, as described above, the media guidance application may determine that the object of "water" may be associated with an "ocean" object in a video frame of the movie "Titanic". In another example, the media guidance application may determine that the sky may be associated with particular colors (e.g., light colors during day time and dark colors during night time).

The media guidance application may modify the video object to include the determined advertisement on the video object. In some embodiments, if an advertisement is to be displayed on the ocean surface, the media guidance application may modify the data structure associated with the surface to include the advertisement. In some embodiments, the media guidance application may generate for display, the object modified with the advertisement on the user display device.

The media guidance application may detect a type of the surface by detecting a color associated with the surface. In some embodiments, the media guidance application may retrieve a color range associated with the surface. For example, the media guidance application may determine that the color of the surface may range from a dark blue to navy blue, based on different values of encoded color.

The media guidance application may compare the color range with color ranges for known surfaces, and may determine, based on comparing the color range with the color ranges for known surfaces, the type that matches the color range. For example, the media guidance application may determine that the detected color range of a dark blue to a navy blue corresponds to colors associated with a water body.

The media guidance application determines a type of the surface by determining a shape associated with the surface. In some embodiments, the media guidance application may detect a shape associated with the surface. For example, the shapes associated with a surface may be, a "plane", a "circle", a "rectangle", and others.

The media guidance application may compare the shape with shapes for known surfaces and may determine, based on comparing the shape with the shapes for known surfaces, the type that matches the shape. For example, the media guidance application may determine that the detected surface is associated with the shape of water waves, and therefore, the surface is an ocean in a frame of the movie "Titanic".

The media guidance application may divide the video into regions based on a resolution of the video. In some embodiments, the media guidance application may detect a resolution of the video frame and may select the first plurality of points based on the resolution of the video frame. For example, the media guidance application may determine a resolution of the screen in order to determine the number of regions the screen may be divided into. In some examples, a greater number of regions that the screen may be divided into may lead to a greater number of points for analysis.

The media guidance application may calculate a change in color between various points associated with the first point. In some embodiments, the media guidance application may retrieve a first plurality of color values for a plurality of color components for the first point. For example, the media guidance application may determine the value of various color components associated with the first point. The media guidance application may determine the values for the red, green, and blue components of the colors for the first point.

The media guidance application may retrieve a second plurality of color values for a second plurality of color components for a second point, where the second point is in the second plurality of points. For example, similar to the first point, the media guidance application may determine the value of various color components associated with a second point. The media guidance application may determine the values for the red, green, and blue components of the colors for the second point. The second point may be within a predetermined threshold distance from the first point.

The media guidance application may compare each value in the first plurality of values representing a color of the first point with a corresponding value in the second plurality of values and may determine, based on comparing each value in the first plurality of values representing the color of the first point with the corresponding value in the second plurality of values, a difference between each color component and may store the difference between each color component.

For example, the media guidance application may compare the determined color components of a first point and the determined color components of the second point by comparing each color component individually. In some examples, the media guidance application may compare the red, blue, and green values of the first point and the second point. The media guidance application may store the difference in the color components of the first and the second points.

In some embodiments, the media guidance application may compare coordinates within the video frame of each point of the subset of points with coordinates of other points with the subset of points. For example, the media guidance application may determine a first coordinate of the first point and compare the first coordinate with coordinates of the set of points that constitute a surface.

The media guidance application, based on comparing the coordinates, may determine edges of the surface and store coordinates of the edges in the data structure. For example, the media guidance application may determine the coordinates of the points that constitute the edges of the surface and store the coordinate of the edges.

In some embodiments, the media guidance application may retrieve a plurality of frames that are scheduled to be displayed subsequent to the video frame. For example, the media guidance application may process frames of a movie "Titanic" subsequent to the current frames that are about to be displayed on the user device.

The media guidance application may compare colors associated with coordinates of the edges in the data structure with colors associated with corresponding cording within each frame of the plurality of frames. For example, the media guidance application may extract colors of the previously determined edges of the surface in the frames subsequent to the frame being displayed on the user device. In such examples, the media guidance application may also determine colors of other points of the surface in frames subsequent to the frames being displayed on the user device.

The media guidance application may determine, for each frame of the plurality of frames and based on comparing the colors associated with coordinates of the edges in the data structure with the colors associated with corresponding cording within each frame of the plurality of frames, whether the colors associated with each coordinate of the edges in the data structure match the colors associated with a respective coordinate associated with the video frame.

The media guidance application may add the advertisement to those frames where the colors associated with each coordinate of the edges in the data structure match the colors associated with a respective coordinate associated with the video frame.

The media guidance application may refrain from adding the advertisement to those frames where the colors associated with each coordinate of the edges in the data structure does not match the colors associated with a respective coordinate associated with the video frame.

For example, the media guidance application may determine points that constitute edges of a surface and points that constitute the center of a surface. The media guidance application may determine whether the color of the points at the center changes from the color of the points at the edges for more than a predetermined threshold.

The media guidance application may analyze frames, subsequent to the video frame being displayed on the user device, to determine for how long the color on the edges of the detected surface of "water" in the frames matches the color of the points in the center of the surface of "water". The media guidance application may determine how long the color on the edges of the detected surface is similar to the color of the points in the center by determining a number of frames for which the difference in color stays below a predetermined threshold. In some examples, the media guidance application may determine that a difference in color may be below a threshold difference for 50 frames which is greater than a predetermined threshold of 25 frames. Upon determining that the color difference between the points at the center and the points at the edges is below a predetermined threshold of difference for a predetermined threshold of time (25 frames), the selected advertisement is inserted on that surface of the "water" in frames of the movie "Titanic". In case the color difference is not below a particular threshold for the particular predetermined threshold of time (25 frames), the advertisement is not inserted on the surface as that may interrupt content important for the user.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for dynamically identifying a surface in a video frame suitable for inserting advertisements. For example, a media guidance application associated with a user device (e.g., a set-top box) may be configured to detect an ocean surface in a scene of a movie and may be further configured to insert an advertisement on the ocean surface while the user is consuming that media asset.

Figure 1:
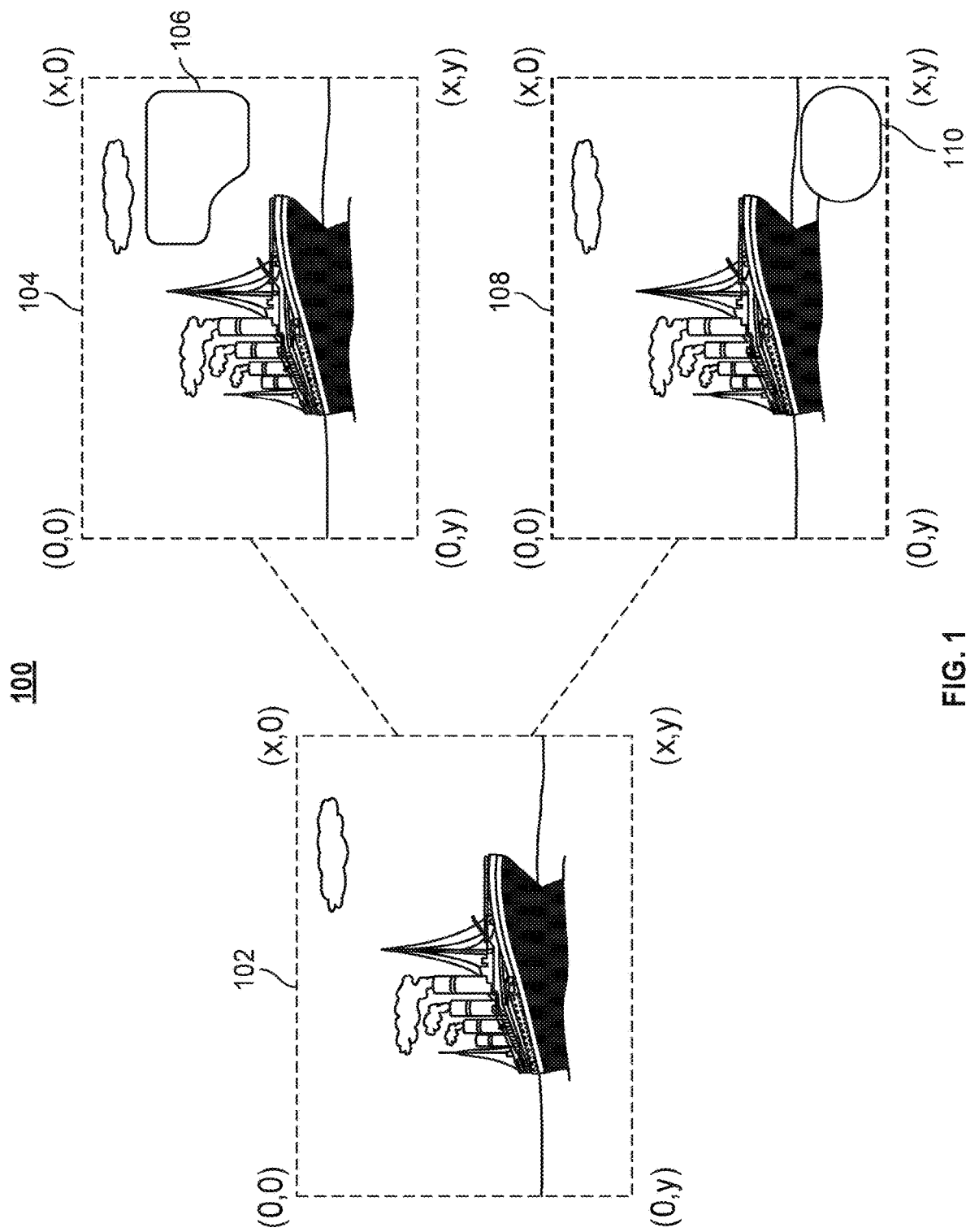
FIG. 1 shows an illustrative example of identifying a surface in a video frame of a media asset, in accordance with some embodiments of the disclosure.

FIG. 1 shows an illustrative example of identifying a surface in a video frame of a media asset, in accordance with some embodiments of the disclosure. FIG. 1 contains a depiction of a video frame 102. Video frame 104 is a first exemplary depiction where the media guidance application has identified a surface 106 for an advertisement in video frame of the movie "Titanic". Video frame 108 is a second exemplary depiction of an identified surface 110 to insert an advertisement in the video frame 108. The number of surfaces depicted in video frames 104 and 108 are for exemplary purposes only. In some embodiments, the media guidance application may identify multiple surfaces for advertisements in a video frame (e.g., video frame 102).

In order to determine a suitable surface in a video frame of a media asset for advertisement placement, the media guidance application may select a first plurality of points in a video frame 102 of a media asset. In some embodiments, the media guidance application may divide video frame 102, that is about to be displayed into a plurality of regions based on a predetermined algorithm. In some embodiments, the predetermined algorithm may require the media guidance application to divide video frame 102 into squares of multiple regions where each region may be a square that is adjacent to other regions (e.g., other squares) that make up the area of the frame. The media guidance application may identify, to be included in the plurality of points, one or more points that may be inside of each region (e.g., each square) or the points may be at the intersections of the lines that make up each square. For example, in the case that a square in video frame 102 is surrounded by squares on all four sides, all four points of the square, where the surrounding squares intersect the selected square, are selected. Similarly, if the square in video frame 102 is surrounded by squares only on two sides, only two or three points, where the surrounding squares intersect the selected square interact, are selected.

In some embodiments, the predetermined algorithm may require the media guidance application to divide frame 102 into regions of concentric circles where the radius of each circle is progressively larger. The media guidance application may identify one or more points that may be within the perimeter of some of the concentric circles or points that may be on the perimeter of some of the concentric circles to be the first plurality of points.

In some embodiments, the predetermined algorithm that divides video frame 102 into multiple regions may factor in at least one of a resolution of the media asset and a resolution of the user device the media asset is being consumed on. The media guidance application may detect a resolution of the video frame and may select the first plurality of points based on the resolution of the video frame.

For example, the number of square or circular regions that video frame 102 may be divided in may depend on the resolution of the media asset and the resolution of the user device. In some examples, a higher resolution denotes a higher number of regions that video frame 102 may be divided into which will provide more points for analyzing the video frame.

The predetermined algorithms described herein are for exemplary purposes only. The media guidance application may contain other predetermined algorithms that divide the frame 102 into regions in different patterns and select points of the frame for detecting a surface to place an advertisement.

The media guidance application may process the first plurality of points detected in video frame 102. The media guidance application may detect a color associated with each point of the first plurality of points. For example, the media guidance application may determine that a first point, from a portion of video frame 102 to be displayed, may be "blue" in color and a second point in video frame 102 may be "black" in color. The color of the points may depend on the objects on the screen that the point may be associated with. The media guidance application may retrieve from memory color values associated with the first plurality of points.

The media guidance application may determine the colors of the first plurality of points using a predetermined color encoding scheme. An example of a color encoding scheme is the "RGB" scheme where color information relating to each pixel in video frame 102 may be stored as three-color components, Red, Green, and Blue. The red, green, and blue color components are added together in various ways to reproduce different colors. In this scheme, the colors are represented in the form of the intensities of the red, blue, and green lights that compose the color. The values of the intensities of the red, green, and blue, are represented as a value between 0 and 255 respectively. For example, the color orange may be represented as 255 160 0.

Another example of a color encoding scheme is the CMYK color model. The CMYK color model is a subtractive color model using cyan, magenta, yellow and key (black). Colors represented by this encoding scheme are represented by percentage of cyan, magenta, yellow and black in them. For example, the color orange in the CMYK scheme may be represented as CMYK (0%, 35%, 100%, 0%). Based on the encoding, the color value of each value of the first plurality of values may be determined and stored in memory by the media guidance application.

The media guidance application may iterate through each point in the first plurality of points of video frame 102 to determine positional information related to each point in the first plurality of points. Contextual information may include, color, type of surface, and duration that the color and type of surface stay constant for the point. The media guidance application may begin the iteration process by selecting a first point in the first plurality of points. The selection of the point may be based on the iteration process. For example, the media guidance application may start the iteration with a top-right corner and proceed in a clockwise direction. It should be noted that different starting points may be used in this process. In some embodiments, the selection of the first point in the first plurality of points may be dependent on the shapes that video frame 102 is divided in. For example, if video frame 102 is divided in concentric circles, the media guidance application may select the first point in the plurality of points to be the point closest to the common center of video frame 102 and the concentric circles.

The media guidance application may calculate a distance between the first point and other points in the first plurality of points. For example, the media guidance application may select a first point in video frame 102 where the first point is part of a portion of video frame 102 that contains an ocean. Other points in the first plurality of points may include points in direct proximity to the first point or at a certain distance from the first point. For example, some points may be in direct proximity to the first point in the ocean in video frame 102 and may be part of the hull of the ship close to the ocean. In some examples, some points connected to the first point in the ocean in video frame 102 may be part of the background sky. In some embodiments, the media guidance application may compute a distance between the first point and all the other points in the first plurality of points.

In some embodiments, the media guidance application may compute a distance between the first point and other points in the first plurality of points up to a certain distance from the first point. For example, the media guidance application may not compute a distance between the first point and any point that is more than half the horizontal resolution of the total frame (x/2) away from the first point.

Based on the distances computed between the first point and other points in the first plurality of points, the media guidance application may select a second plurality of points, where the second plurality of points includes points within a predetermined threshold distance of the first point. For example, within the first plurality of points, the media guidance application may determine points that are within a predetermined threshold distance from the first point.

In some examples, the distance may be measured in terms of the number of points between the first point and a second point. Based on the calculation of distance of each point in the first plurality of points from the first point, the media guidance application may determine a second plurality of points that are within the predetermined threshold distance from the first point. For example, the second plurality of points may include points in the first plurality of points that are less than three points away from the first point.

In some embodiments, the threshold distance may be measured based on the size of the frame. For example, the threshold distance may be configured to be x/10, where x is the horizontal resolution of video frame 102. All points in the first plurality of points, that are within the predetermined threshold distance away from the first point, may be selected to be the second plurality of points.

The media guidance application may calculate a change in color between the points in the second plurality of points. Specifically, the media guidance application may calculate a change in color between the first point and each point of the second plurality of points. For example, the media guidance application may determine that the first point in video frame 102 is "blue" (RGB: 0 0 255) in color and that other points in the set of the second plurality of points have a color that is a shade of "blue" namely "steel blue" (RGB: 70 130 180). The first point may be a point in the water region of video frame 102. Other points in the second plurality of points in video frame 102 may be in the water region, on the hull of the ship, or in the background of the sky. The points in the second plurality of points may be within a predetermined threshold distance from the first point.

The media guidance application may calculate a change in color between the points in the second plurality of points and the first point based on the values of the encoded color. For example, in case the colors are encoded in the RGB encoding scheme, the media guidance application may compute a difference in the red, blue, and green values of two points separately. The media guidance application, may compute a change in color between the first point (blue color of the ocean, RGB value 0 255 0) and a second point in the second plurality of points (black, of the hull, RGB value 0 0 0).

The media guidance application may group together the points that are within a predetermined threshold color change. Particularly, the media guidance application may generate, based on the comparing, a subset of points that are within the threshold color change. For example, the media guidance application may group points in the second plurality of points based on the computed color difference between a plurality of points. For example, if the colors are encoded in the RGB encoding, the media guidance application may compute a difference in the red, blue, and green values of two points separately, and the difference of each of the red, green, and blue values may be required to be below the predetermined threshold (e.g., red values within two percent, green values with two percent, and blue values within two percent). In some embodiments, the difference of only a subset of the red, green, and blue values may be required to be within a predetermined threshold. The selection of the subset of red, green, and blue may be based on the characteristics of the screen, or the red, green, and blue values themselves. In some embodiments, the media guidance application may store the boundary RGB values for colors that are similar to each other. For example, the different shades of turquoise may have RGB values close to each other, and the media guidance application may only compute a difference in the green and blue components of various turquoise colors as the turquoise shades do not have a red component. For example, a first shade of turquoise has RGB value 0 245 255 and a second shade of turquoise has RGB value 0 229 238. In comparison of these two shades, the media guidance application may not compare the red values. Additionally, the media guidance application may store such colors as "edge colors" for future comparisons.

When the computed difference in the color of the points is less than a predetermined threshold, the point may be grouped along with the first point. The media guidance application may compute a change in color in the values of the first point (blue color of the ocean, RGB value 0 0 255), and a second point in the second plurality of points (black, of the hull, RGB value 0 0 0). While the red and green values of the two colors are the same (0), there is a difference in the blue value of the first point and the other point. The media guidance application may set the threshold difference of color to be 10 units. As the blue value of the colors differ by more than 10 units, the two points may not be grouped together. In some embodiments, a unit may correspond to a value on the RGB scale. For example, a color with RGB value 240 40 233 has 200 units of red, 40 units of green and 233 units of blue. In some embodiments, the threshold may be set based on a percentage value of the color change. For example, the media guidance application may configure the threshold difference between the color of the first point from the second point to be only 1%.

In video frame 102, the first point may show? part of the ocean and have blue color (RGB: 0 0 255), and the media guidance application may group all points together that have a similar color as that of the first point. For example, the media guidance application may determine that points that are part of the hull (black in color, RGB 0 0 0), or points that are part of the background sky (different shade of black like gray, RGB: 11 11 11), may have colors that are different from the first point in the ocean by more than a predetermined threshold (10 units).

Therefore, the media guidance application may group the first point with points of the ocean that are within a predetermined color threshold (10) of the first point, based on the difference in color computed between the first point and other points in the second plurality of points.

The media guidance application may generate a data structure of a surface using the grouped points. Particularly, the media guidance application may generate, based on the subset of points, a data structure representing a surface. For example, the media guidance application may associate the grouped points in the second plurality of points to represent a surface. The grouped points may be stored as a multidimensional array of encoded color values, an object of a surface class, or another suitable data structure. The data structure of the grouped points may be stored in a memory associated with the media guidance application.

The media guidance application may select an advertisement to be placed on the surface represented by the data structure comprising the grouped points. Particularly, the media guidance application may select, based on the data structure representing the surface, an advertisement of a plurality of advertisements for display with the video frame. For example, the media guidance application may determine, from a set of advertisements, the most suitable advertisement to be placed on the determined surface. For example, if the surface is water (e.g., an ocean), the media guidance application may select a ship and store the ship in memory with an advertisement to be placed on the water.

In some embodiments, the process of selecting an appropriate advertisement for the determined surface includes determining a type associated with the surface. In some embodiments, the media guidance application may determine a type associated with the surface. For example, the type of the surface may be an object in the video frame like "ocean", "wall", "ship", or "sky".

In some embodiments, the media guidance application may detect a type of the surface by detecting a color associated with the surface. In some embodiments, the media guidance application may retrieve a color range associated with the surface. For example, the media guidance application may determine that the color of surface 106 in video frame 104 may range from a light blue to blue based on different values of encoded color.

The media guidance application may compare the color range of surface 106 with color ranges for known surfaces, and may determine, based on comparing the color range with the color ranges for known surfaces, the type that matches the color range. For example, the media guidance application may determine that the detected color range (RGB: 0 178 238 (deep sky blue)—RGB: 178 223 238 (light blue)) corresponds to colors associated with the sky.

The media guidance application may determine a type of the surface by determining a shape associated with the surface. In some embodiments, the media guidance application may detect a shape associated with the surface. For example, the shapes associated with a surface may be, a "plane", a "circle", a "rectangle", and others. The media guidance application may determine a shape of a cloud in surface 106 of video frame 104. For example, the media guidance application may have standard shapes stored in memory, where different shapes are stored using different methods. A circle may be stored using a center and a radius. In order to determine whether a certain point is part of a circle, the media guidance application may determine if there are a threshold number of points diametrically opposite each other in the group of points that constitute the surface. In case the number of points diametrically opposite each other are above a certain predetermined threshold, the media guidance application may determine that the surface has a circular shape.

The media guidance application may compare the shape with shapes for known surfaces and may determine, based on comparing the shape with the shapes for known surfaces, the type that matches the shape. For example, the media guidance application may determine that the detected surface is associated with the shape of clouds, and therefore, surface 106 in video frame 104 is part of a sky. In some embodiments, the media guidance application may have shapes stored in memory that constitute clouds, and the media guidance application may compare the stored shape of clouds to the group of points constituting the surface to determine whether the surface is a cloud.

The media guidance application may compare the type associated with the surface with metadata associated with each advertisement of the plurality of advertisements. For example, the media guidance application may compare the determined type of the surface 106 (sky) with metadata associated with advertisements in the set of advertisements. For example, the type associated with the ocean in video frame 102 may be water.

The media guidance application may retrieve an advertisement based on the type of surface. For example, the media guidance application may determine that the type associated with surface 106 in video frame 104 is "sky". The media guidance application may search through the metadata of the available advertisements and select an advertisement that has some relation to the "sky". The metadata associated with advertisements may contain tags associated with the content of advertisements. For example, the metadata associated with an advertisement of a plane may contain words like plane, sky-writer, or blimp to describe advertisements. The media guidance application may determine that these advertisements are associated with the sky and may be shown on surface 106 of video frame 104.

Similarly, the media guidance application may determine that surface 110 in video frame 108 is the "ocean". The media guidance application may make this determination by comparing the color of surface 110 ("ocean") with known color ranges and the shape of the waves with known shapes. Upon determining that surface 110 is of the type "ocean", the media guidance application may search the metadata of available advertisements for advertisements that are most appropriate to be displayed on surface 110 ("ocean") in video frame 108. Some examples of advertisements relating to water may be advertisements that contain a water vehicle (e.g., a yacht, jet-ski, boat, ship or another suitable advertisement). Additionally or alternatively, the advertisement may be for an activity relating to water (e.g., scuba-diving, snorkeling, or another suitable activity).

The media guidance application may generate the selected advertisement for display. Particularly, the media guidance application may generate for display the advertisement so that it appears on the surface. For example, the media guidance application may display the selected advertisement on an ocean surface determined in a video frame 102, when the particular frame is displayed on the screen of the user device. For example, the media guidance application may retrieve an advertisement from a set of advertisements available in memory based on the determined type of surface. The media guidance application overlays the retrieved advertisement on the determined surface at the appropriate coordinates. In some embodiments, the determined surface may be part of a moving object (e.g. car, ship, plane), and the coordinates for placing the advertisement may be updated to match with the changing coordinates of the moving surface.

In some embodiments, the media guidance application may determine an object associated with the type of surface before inserting the advertisement. For example, as described above, the media guidance application may determine that the surface 110 ("ocean") may be associated with a "water" object in video frame 108.

The media guidance application may modify the video object to include the determined advertisement on the video object. In some embodiments, if an advertisement is to be displayed on surface 110, the media guidance application may modify the data structure associated with the surface to include the advertisement. In some embodiments, the media guidance application may generate for display, the object modified with the advertisement on the user display device. For example, the media guidance application may modify the multidimensional array or the object of class surface to include an indication of the advertisement that is to be displayed on the surface 106 or 110 when video frame 104 or 108 is displayed on the user device.

The media guidance application may determine the boundaries of surfaces 106 and 110 by comparing coordinates of points within surface 106 or 110. For example, the media guidance application may determine a first coordinate of the first point and compare the first coordinate with coordinates of the set of points that constitute a surface.

The media guidance application may, based on comparing the coordinates, determine the left most edge, the right most edge, the topmost edge and the bottom most edge of the surface. The media guidance application may store the determined edges of the surface, and store coordinates of the edges in the data structure. In some embodiments, the media guidance application may compare the coordinates of the various points grouped together to form a surface and determine the coordinate that is the lowest and highest value for each index. For example, the media guidance application may compare points having coordinates (0,0), (1, 5), (5, 0), (5, 1), and determine that for the first index (e.g. x-axis), to the lowest value is 0 and the highest value is 1. These points constitute the edge on the first index. Similarly, the media guidance application may determine that the highest and lowest value for the points on the second index (e.g. y-axis) are 0 and 1. Coordinates of points having an extreme value in at least one(?) of the indexes would constitute a point on the edge of the surface.

In some embodiments, the edges of the surface may not be perpendicular to each other. For example, the detected surface may be a triangle with lines that may not be perpendicular to the axis of video frame 102. In such cases, the media guidance application may first determine the furthest most points of the surface as the vertices of the surface. The media guidance application may then determine points on lines that join the edges by comparing the vertices of the furthest most point of x index for each y value and vice versa. For example, the surface may be composed of points (5, 5), (0, 0), (6, 1), (2, 4). In this example, the media guidance application may determine that the highest and lowest points on the first index (x-axis) are 0 and 6. For each value on the first index between 0 and 6, the media guidance application may determine the values of the second index that are highest and lowest, and therefore, constitute the edges of the surface. In this example, point (2,4) is part of the edge of the surface as it has the highest value of the second index (4) at the value 2 of the first index. The media guidance application may determine and store the determined edges of a surface in the multidimensional array representing the surface or may store the edge coordinates as part of the object of the surface class. Surfaces of various shapes may have their boundaries represented differently. For example, for a circular surface, the media guidance application may just store center coordinates and a radius.

In some embodiments, to determine whether surface 106 or 110 is suitable for placing an advertisement, the media guidance application may determine the length of time for which surface 106 or 110 may remain on the screen of the user device. The length of time may be determined in terms of the number of video frames for which the surface is present. In some embodiments, the media guidance application may determine a length of time for a surface by determining the number of seconds for which the surface 106 or 110 is present on the screen of the user device. In some embodiments, the media guidance application may determine the number of seconds based on the number of video frames being displayed on the screen per second or using a different unit of video frame consumption.

In some embodiments, the media guidance application may retrieve a plurality of frames that are scheduled to be displayed subsequent to the video frame. The plurality of frames retrieved may be based on the rate of consumption of the video frames. In some embodiments, the number of video frames retrieved may represent the least amount for which a surface must be present in order to place an advertisement. The media guidance application may process the video frames subsequent to the current frame (e.g., frame 102) that is about to be displayed on the user device.

The media guidance application may compare colors associated with coordinates of the edges in the data structure associated with surface 106 or 110 with colors associated with corresponding coordinates within each frame of the subsequent plurality of frames. For example, the media guidance application may extract colors of the previously determined edges of surface 106 or 110 in the video frames subsequent to video frame 102 being displayed on the user device. In such examples, the media guidance application may also determine colors of other points of surface 106 or 110 in video frames subsequent to the frames being displayed on the user device.

The media guidance application may determine, for each video frame of the plurality of video frames and based on comparing the colors associated with coordinates of the edges in the data structure with the colors associated with corresponding coordinates within each frame of the plurality of frames, whether the colors associated with each coordinate of the edges in the data structure match the colors associated with a respective coordinate associated with the video frame. Over the plurality of frames being processed, the media guidance application may determine when the colors of the points corresponding to the surface 106 or 110 change more than a threshold.

The media guidance application may add the advertisement to those video frames where the colors associated with each coordinate of the edges in the data structure match the colors associated with a respective coordinate associated with the video frame.

The media guidance application may refrain from adding the advertisement to those video frames where the colors associated with each coordinate of the edges in the data structure do not match the colors associated with a respective coordinate associated with the video frame.

For example, the media guidance application may determine points that constitute edges of a surface 106 and 110 and points that constitute the center of a surface. The media guidance application may determine whether the color of the points at the center changes from the color of the points at the edges for more than a predetermined threshold.

The media guidance application may analyze frames, subsequent to the video frame being displayed on the user device, to determine for how long the color on the edges of the detected surface of "water" in the video frames matches the color of the points in the center of the surface of "water". The media guidance application may determine how long the color on the edges of the detected surface is similar to the color of the points in the center by determining a number of frames for which the difference in color stays below a predetermined threshold. In some embodiments, the media guidance application may determine that a difference in color may be below a threshold difference for 50 frames, which is greater than a predetermined threshold of 25 frames. Upon determining that the color difference between the points at the center and the points at the edges is below a predetermined threshold of difference for a predetermined threshold of time (25 frames), the media guidance application may insert the selected advertisement into the frame so that the advertisement appears on that surface of the "water." In case the color difference is not below a particular threshold for the particular predetermined threshold of time (e.g., 25 frames), the media guidance application may refrain from inserting the advertisement on the surface as that may interrupt content important for the user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
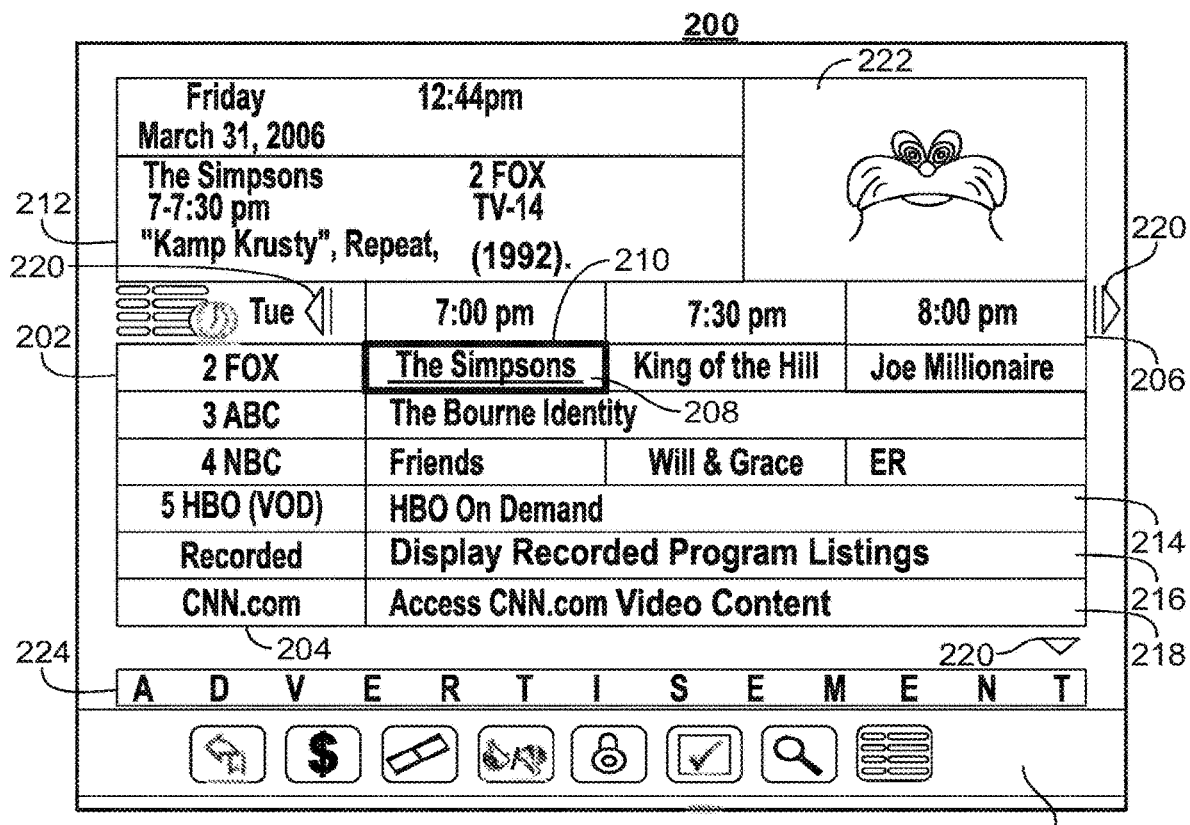
FIG. 2 shows an illustrative embodiment of a display screen that may be used to provide media guidance application listings and other media guidance information, in accordance with some embodiments of the disclosure.
Figure 3:
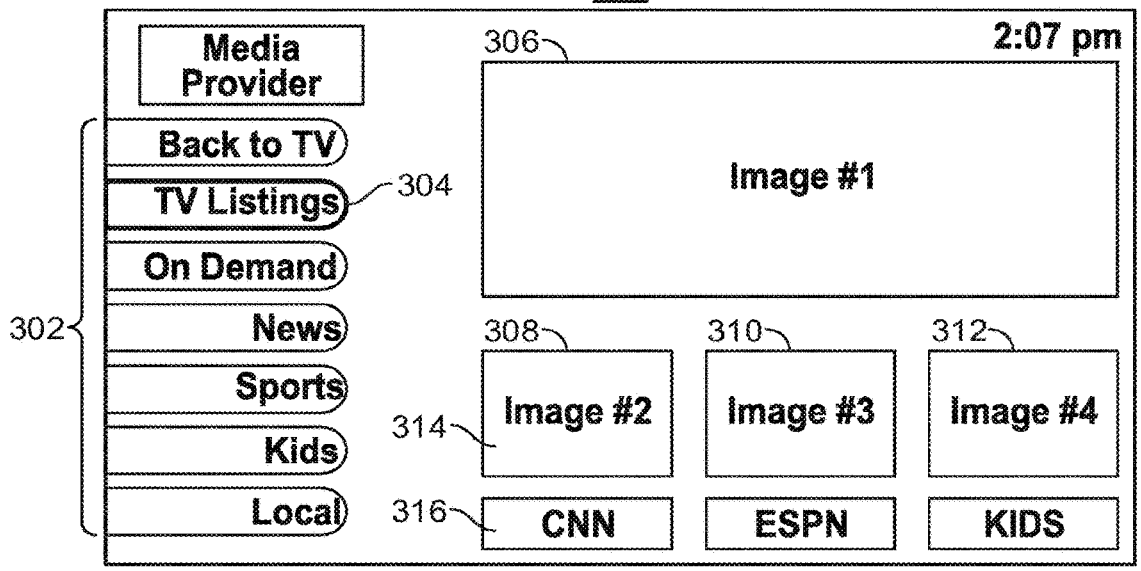
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
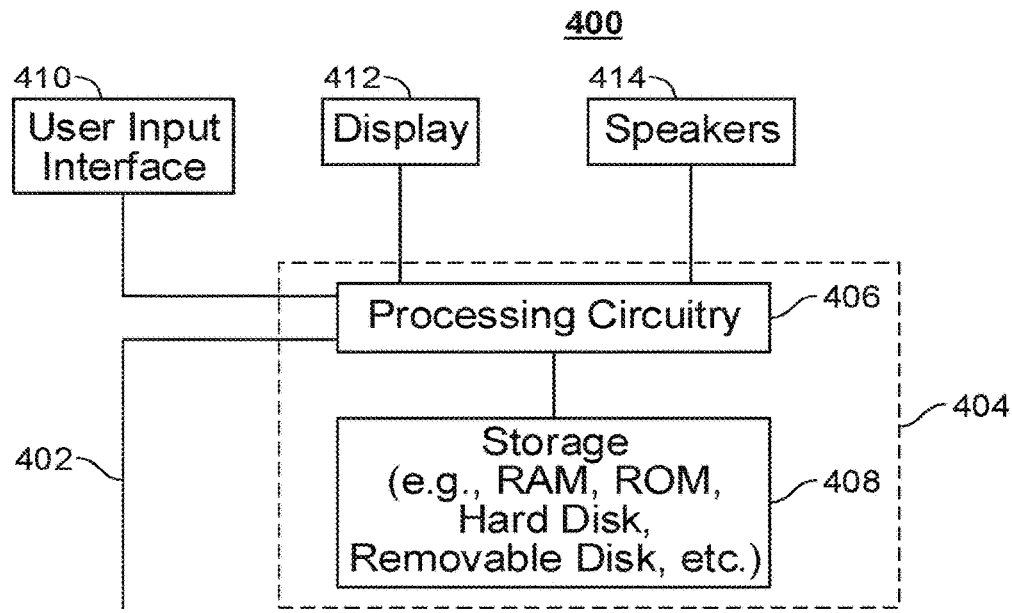
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
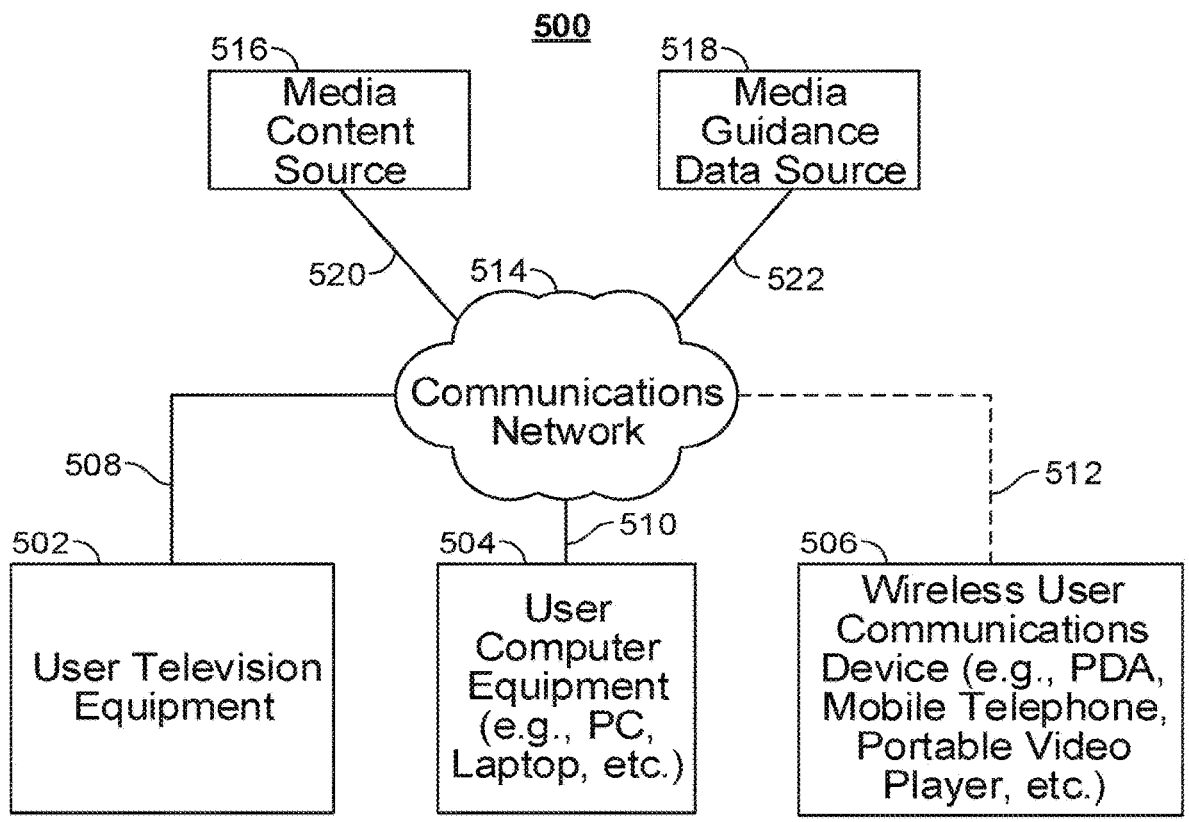
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
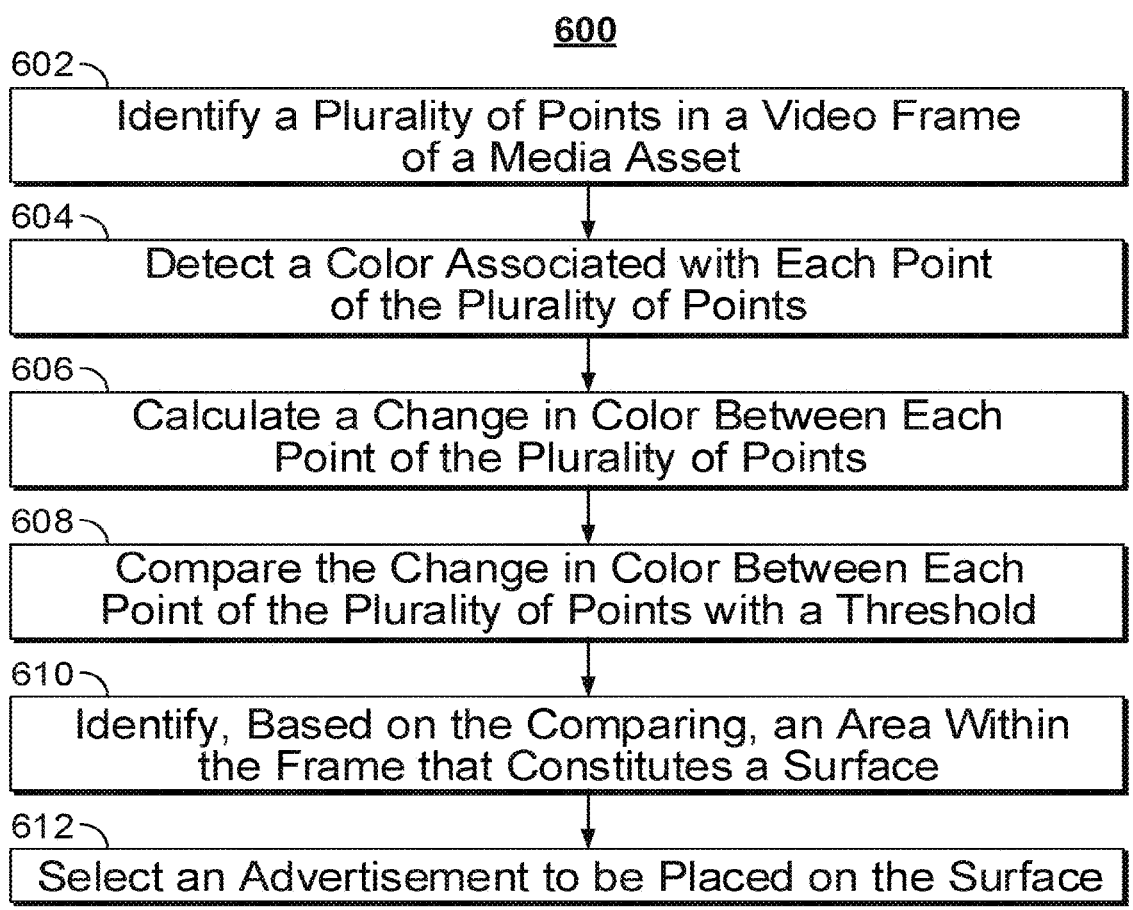
FIG. 6 depicts an illustrative flowchart of a process for dynamically inserting advertisements in a media asset, in accordance with some embodiments of the disclosure.

FIG. 6 depicts an illustrative flowchart of a process for dynamically inserting advertisements in a media asset, in accordance with some embodiments of the disclosure. Process 600 may be executed by control circuitry 404 (e.g. in a manner instructed to control circuitry 404 by the media guidance application). In addition, one or more steps of process 600 may be incorporated into or combined with one or more steps of any other process or embodiment (e.g., as described in relation to FIGS. 7-9).

Process 600 begins at 602, where control circuitry 404 identifies a plurality of points in a video frame of the media asset. For example, the control circuitry may retrieve a video frame (e.g., video frame 102) from storage 408. In some embodiments, the control circuitry may retrieve the video frame from a remote server (e.g., a server associated with media content source 516 and/or media guidance data source 518).

At 604, control circuitry 404 detects a color associated with each point of the plurality of points. For example, the control circuitry may determine the colors of the plurality of points, stored in storage 408, using a predetermined color encoding scheme. In some embodiments, the control circuitry may retrieve the colors associated with points from a remote server (e.g., a server associated with media content source 516 and/or media guidance data source 518).

At 606, control circuitry 404 calculates a change in color between each point of the plurality of points. For example, the control circuitry may retrieve the color associated with each point in the plurality of points from storage 408. The colors may be stored in one of many encoding schemes. Processing circuitry 406 may compare the different component colors of each point in the plurality of points with other points in the plurality of points.

At 608, control circuitry 404 compares the change in color between each point of the plurality of points within a threshold. The processing circuitry 406 may compare the calculated difference in color between the first point and the second point with a predetermined threshold stored in storage 408.

At 610, control circuitry 404 identifies, based on the comparing, an area within a frame that constitutes a surface. Based on the comparing of the color values of the plurality of points, the control circuitry may use processing circuitry 406 to group points together based on measured differences in colors. In some embodiments, the media guidance application may store the grouped points in a data structure at storage 408. In some embodiments, the control circuitry may store the grouped points on a remote server (e.g., a server associated with media content source 516 and/or media guidance data source 518).

At 612, control circuitry 404 selects an advertisement to be placed on the surface. Based on the surface identified, the control circuitry may use processing circuitry 406 to select an appropriate advertisement to be placed on the surface from storage 408. In some embodiments, the control circuitry may select an advertisement stored on a remote server (e.g., a server associated with media content source 516 and/or media guidance data source 518). In some embodiments, the control circuitry may display the advertisement on video frame 102 displayed on display 412.

Figure 7:
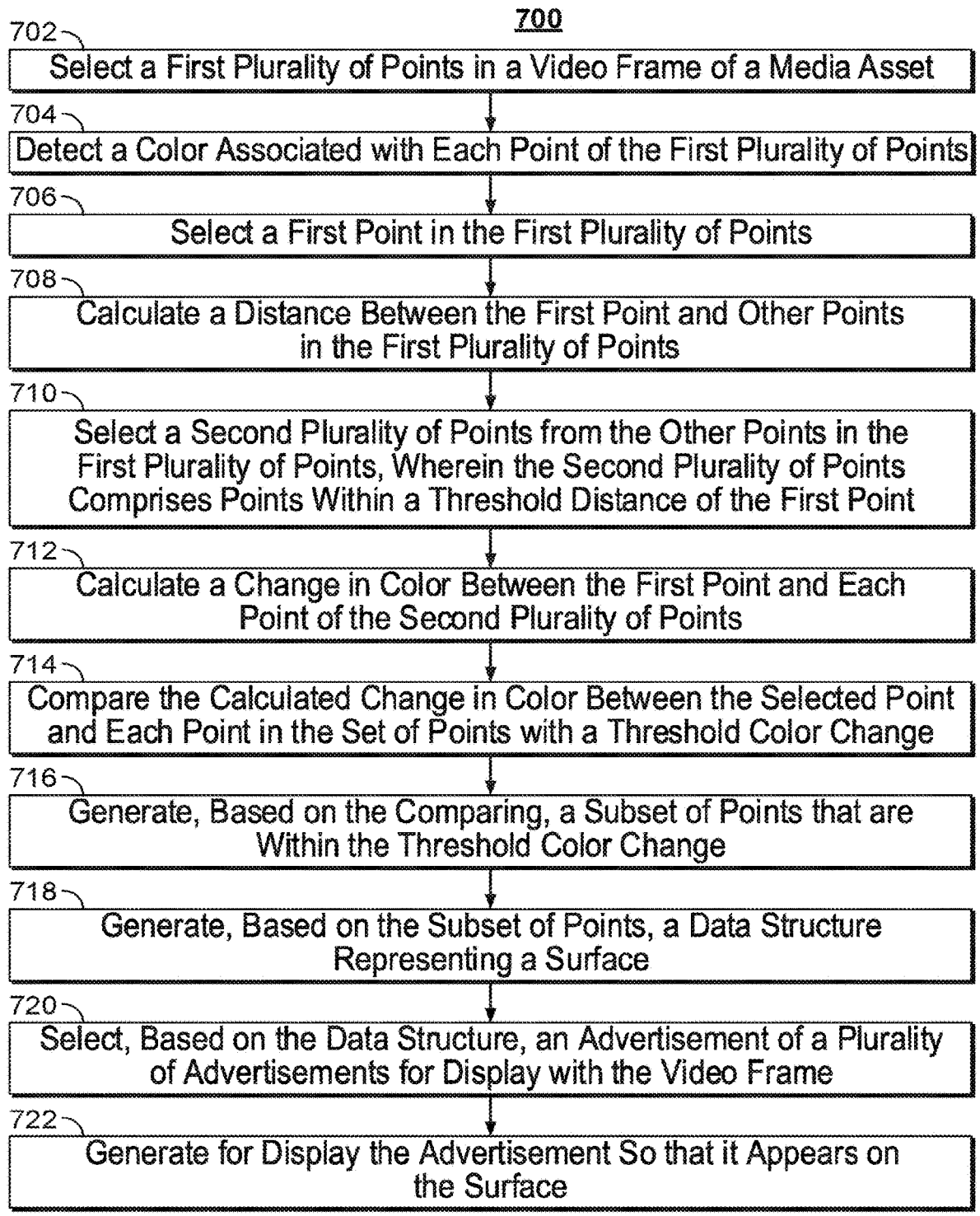
FIG. 7 depicts another illustrative flowchart of a process for dynamically inserting advertisements in a media asset, in accordance with some embodiments of the disclosure.

FIG. 7 depicts an illustrative flowchart of a process for dynamically inserting advertisements in a media asset, in accordance with some embodiments of the disclosure. Process 700 may be executed by control circuitry 404 (e.g. in a manner instructed to control circuitry 404 by the media guidance application). In addition, one or more steps of process 700 may be incorporated into or combined with one or more steps of any other process or embodiment (e.g., as described in relation to FIGS. 6 and 8-9).

The process 700 begins at 702, when the control circuitry 404 selects a first plurality of points in a video frame of a media asset. For example, the control circuitry may retrieve a video frame (e.g., video frame 102) from storage 408. In some embodiments, the control circuitry may retrieve the video frame from a remote server (e.g., a server associated with media content source 516 and/or media guidance data source 518).

At 704, the control circuitry 404 detects a color associated with each point of the first plurality of points. In some embodiments, processing circuitry 406 may retrieve the colors of the points in video frame 102 from storage 408. The colors detected by the control circuitry may depend on the objects present in video frame 102. In some embodiments, the control circuitry may retrieve the colors associated with points from a remote server (e.g., a server associated with media content source 516 and/or media guidance data source 518).

At 706, the control circuitry 404 selects a first point in the first plurality of points. The control circuitry may use processing circuitry 406 to select a first point in the first plurality of points. The selection of the point may be based on the iteration process. For example, the control circuitry may start the iteration with a top-right corner and proceed in a clockwise direction. It should be noted that different starting points may be used in this process.

At 708, the control circuitry 404 calculates a distance between the first point and other points in the first plurality of points. For example, the control circuitry may use processing circuitry 406 to select a first point in a video frame (e.g. video frame 102) of a movie "Titanic" that depicts the ocean as part of the frame. Other points in the first plurality of points may include points directly connected to the first point or at a certain distance from the first point.

At 710, the control circuitry 404 selects a second plurality of points from the other points in the first plurality of points, wherein the second plurality of points comprises points within a threshold distance of the first point. The control circuitry may use processing circuitry 406 to determine points that are within a predetermined threshold distance from the first point in a video frame (e.g. video frame 102). The control circuitry may store the second plurality of points at storage 408. In some embodiments, control circuitry may store the second plurality of points on a remote server (e.g., a server associated with media content source 516 and/or media guidance data source 518).

At 712, the control circuitry 404 calculates a change in color between the first point and each point of the second plurality of points. Specifically, the control circuitry may use processing circuitry 406 to calculate a change in color between the first point and each point of the set second plurality of points. In some embodiments, the control circuitry may retrieve colors associated with the second plurality of points from storage 408. In some embodiments, the control circuitry may retrieve the colors associated with the second plurality of points from a remote server (e.g., a server associated with media content source 516 and/or media guidance data source 518).

At 714, the control circuitry 404 compares the calculated change in color between the selected point and each point in the set of points with a threshold color change. In some embodiments, the control circuitry may retrieve a threshold color change from storage 408. In some embodiments, the control circuitry may retrieve the threshold color change from a remote server (e.g., a server associated with media content source 516 and/or media guidance data source 518).

At 716, the control circuitry 404 generates, based on the comparing, a subset of points that are within the threshold color change. The control circuitry may group together the points that are within a predetermined threshold color change. Particularly, the control circuitry may use processing circuitry 406 to generate, based on the comparing, a subset of points that are within the threshold color change. In some embodiments, the control circuitry may save the grouped points at storage 408. In some embodiments, the control circuitry may save the grouped points at a remote server (e.g., a server associated with media content source 516 and/or media guidance data source 518).

At 718, the control circuitry 404 generates, based on the subset of points, a data structure representing a surface. Particularly, the control circuitry may generate, based on the subset of points, a data structure representing a surface. For example, the processing circuitry 406 may associate the grouped together points in the second plurality of points to represent a surface. The data structure may be of the form of multidimensional array or an object of a defined class surface. In some embodiments, the control circuitry may store the data structure representing the surface in storage 408. In some embodiments, the control circuitry may retrieve the advertisement from a remote server (e.g., a server associated with media content source 516 and/or media guidance data source 518).

At 720, the control circuitry 404 selects, based on the data structure, an advertisement of a plurality of advertisements for display with the video frame. Particularly, the control circuitry may select, based on the data structure representing the surface, an advertisement of a plurality of advertisements for display with the video frame. For example, the processing circuitry 406 may determine, from a set of advertisements, the most suitable advertisement to be placed on the determined surface. In some embodiments, control circuitry may retrieve select advertisements from advertisements stored in storage 408 to determine the most appropriate advertisement to be placed. In some embodiments, the control circuitry may retrieve the advertisement from a remote server (e.g., a server associated with media content source 516 and/or media guidance data source 518).

At 722, the control circuitry 404 generates for display the advertisement so that it appears on the surface. For example, the processing circuitry 406 may display the selected advertisement on an ocean surface determined in video frame 102 of the movie "Titanic" by the processing circuitry 406 when the particular frame is displayed on the screen of the user device. For example, the processing circuitry 406 may generate for display the advertisement with the ship on the ocean's surface 110 in video frame 108. In some embodiments, the control circuitry may display the advertisement on video frame 102 displayed on display 412.

Figure 8:
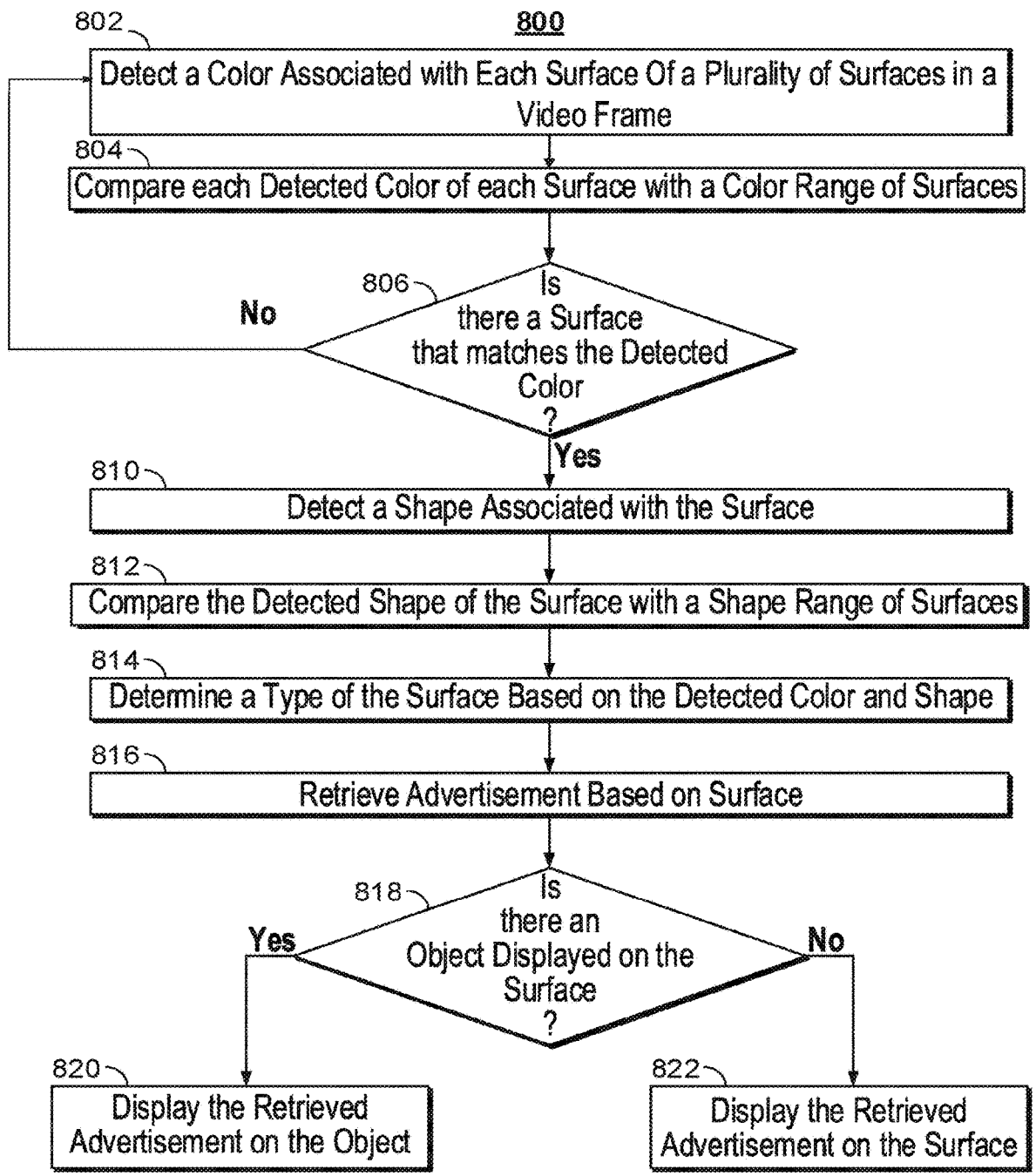
FIG. 8 depicts an illustrative flowchart of a process for determining a type of surface in a video frame of a media asset and displaying an advertisement based on the determined type of surface, in accordance with some embodiments of the disclosure.

FIG. 8 depicts an illustrative flowchart of a process for determining a type of surface in a video frame of a media asset and displaying an advertisement based on the determined type of surface, in accordance with some embodiments of the disclosure. Process 800 may be executed by control circuitry 404 (e.g. in a manner instructed to control circuitry 404 by the media guidance application). In addition, one or more steps of process 800 may be incorporated into or combined with one or more steps of any other process or embodiment (e.g., as described in relation to FIGS. 6, 7, and 9).

Process 800 begins at 802, where control circuitry 404 detects a color associated with each surface of a plurality of surfaces in a video frame. The color of each surface is detected based on the color of each of the points that comprise the data structure of the surface. For example, the media guidance application may detect a color associated with surface 110 of video frame 108 based on the color of the points that constitute the surface. In some embodiments, the media guidance application may detect a range of colors in the surface based on the colors associated with various points of surface 110 in video frame 108.

At 804, the control circuitry 804 compares each detected color of each surface to a color range of surfaces. The media guidance application compares the detected color or the range of detected colors to a color range of surfaces. Each color in the color range may be associated with a particular surface. For example, the color sky blue may be associated with the sky and the colors dark and navy blue may be associated with the water.

At decision block 806, the control circuitry 404 determines whether there is a surface corresponding to the detected color. The media guidance application may search the color ranges to determine if the color associated with the surface corresponds to a color in the color range of surfaces. In case the color of the surface corresponds to a color in the color range, control circuitry 404 proceeds to 810 to detect a shape associated with the surface. In case the color of the surface does not correspond to a color in the color range of surfaces, the control circuitry 404 proceeds to 802 to detect a different color associated with a different surface part of video frame 102.

At 810, control circuitry 404 detects a shape associated with the surface. The media guidance application may determine whether surface 110 is associated with a shape. For example, the media guidance application may detect the shape of waves associated with surface 110 of video frame 108.

At 812, the control circuitry 404 compares the detected shape of the surface to a shape range of surfaces. The media guidance application compares the shape of the waves of surface 110 in video frame 108 to a range of shapes of various surfaces.

At 814, the control circuitry 404 determines a type of the surface based on the detected color and shape. The media guidance application determines that surface 110, having the shape of waves and a dark blue color is a surface of a water body (e.g. ocean) in video frame 108.

At 816, the control circuitry 404 retrieves advertisements based on the surface. Based on determining that surface 110 or video frame 108 is a water body (e.g. ocean), the media guidance application may extract an advertisement from the set of available advertisements that may be associated with water. Some examples of such an advertisement may be related to water-skiing, jet-skiing, snorkeling, cruises, water parks, etc.

At decision block 818, the control circuitry 404 determines whether there is an object displayed on the surface. The media guidance application may determine if the surface of the water may have an object associated with it. For example, the surface of water may have an object of a ship, a boat, an aquatic animal or other objects of the like. In case the media guidance application detects an object on detected surface 110 in video frame 108, the media guidance application proceeds to 820 to display the selected advertisement on the detected object. In case the media guidance application does not determine the presence of an object on the surface, the media guidance application displays the selected advertisement on surface 110 in video frame 108.

At 820, the control circuitry 404 displays the retrieved advertisement in the object. The media guidance application may display the selected advertisement on the object associated with surface 110 of video frame 108. For example, the media guidance application may display the selected advertisement of snorkeling from the set of available advertisements on an object of an aquatic animal that may be associated with surface 110 of video frame 108.

At 822, the control circuitry 404 displays the retrieved advertisement on the surface. The media guidance application may display the selected advertisement of snorkeling, from a list of available advertisements, on the surface of the surface 110 in video frame 108 when the media guidance application may determine that an object is not associated with surface 110.

Figure 9:
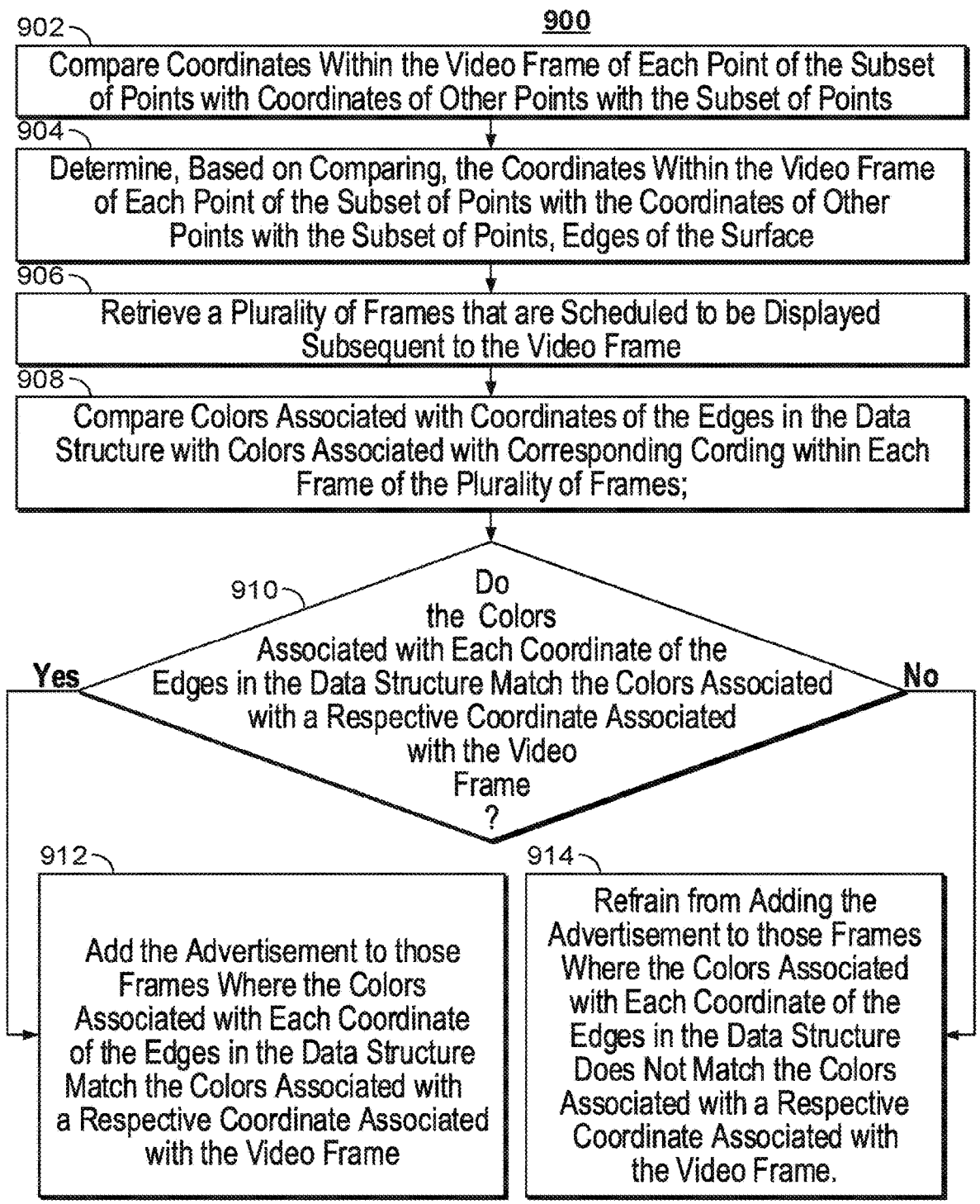
FIG. 9 depicts an illustrative flowchart of a process for determining whether to add advertisements to video frames of a media asset, in accordance with some embodiments of the disclosure.

FIG. 9 depicts an illustrative flowchart of a process for determining whether to add advertisements to video frames of a media asset, in accordance with some embodiments of the disclosure. Process 900 may be executed by control circuitry 404 (e.g. in a manner instructed to control circuitry 404 by the media guidance application). Control circuitry 404 may be part of the remote server being separated from the user equipment device by way of communication network 514. In addition, one or more steps of process 900 may be incorporated into or combined with one or more steps of any other process or embodiment (e.g., as described in relation to FIGS. 6-8).

Process 900 begins at 902, where control circuitry 404 compares coordinates within the video frame of each point of the subset of points with coordinates of other points with the subset of points. The media guidance application compares the coordinates of points that comprise surface 110 of video frame 108. The points representing the surface may be stored in a data structure like a multidimensional array or an object of the class surface.

At 904, the control circuitry 404 determines, based on comparing the coordinates within the video frame of each point of the subset of points with the coordinates of other points with the subset of points, the edges of the surface. Based on the comparing, the media guidance application may determine the points in the surface that constitute the edges of the surface. The points constituting the edges may be stored separately in the multidimensional array data structure of surface 110 of video frame 108.

At 906, the control circuitry 404 retrieves a plurality of frames that are scheduled to be displayed subsequent to the video frame. For example, the media guidance application may process frames of a movie "Titanic", subsequent to the current frame that is about to be displayed on the user device.

At 908, the control circuitry 404 compares colors associated with coordinates of the edges in the data structure with colors associated with corresponding cording within each of the plurality of frames.

At decision block 910, the control circuitry 404 determines whether the colors associated with each coordinate of the edges in the data structure match the colors associated with a respective coordinate associated with the video frame.

At 912, the control circuitry 404 adds the advertisement to those frames where the colors associated with each coordinate of the edges in the data structure match the colors associated with a respective coordinate associated with the video frame.

At 914, the control circuitry 404 refrains from adding the advertisement to those frames where the colors associated with each coordinate of the edges in the data structure do not match the colors associated with a respective coordinate associated with video frame 102.

For example, the media guidance application may determine points that constitute edges of a surface 110 of video frame 108, and points that constitute the center of a surface 110 of video frame 108. The media guidance application may determine whether the color of the points at the center changes from the color of the points at the edges for more than a predetermined threshold.

The media guidance application may analyze frames, subsequent to video frame 108 being displayed on the user device, to determine for how long the color on the edges of the detected surface of "water" in the video frames matches the color of the points in the center of the surface of "water". The media guidance application may determine how long the color on the edges of the detected surface is similar to the color of the points in the center by determining a number of frames for which the difference in color stays below a predetermined threshold. In some examples, the media guidance application may determine that a difference in color may be below a threshold difference for 50 frames, which is greater than a predetermined threshold of 25 frames. Upon determining that the color difference between the points at the center and the points at the edges is below a predetermined threshold of difference for a predetermined threshold of time (25 frames), the media guidance application may insert the selected advertisement on that surface of the "water" in frames of the movie "Titanic". In case the color difference is not below a particular threshold for the particular predetermined threshold of time (25 frames), the media guidance application may refrain from inserting the advertisement on the surface as that may interrupt content important for the user.

It is contemplated that the steps or descriptions of FIGS. 6-9 may be used with any other embodiment of this disclosure. In addition, the descriptions described in relation to the algorithm of FIGS. 6-9 may be done in alternative orders or in parallel to further the purposes of this disclosure. For example, in some embodiments, several instances of a variable may be evaluated in parallel using multiple logical processor threads or the algorithm may be enhanced by incorporating branch prediction. Furthermore, it should be noted that the process of FIGS. 6-9 may be implemented on a combination of appropriately configured software and hardware and that any of the devices or equipment discussed in relation to FIGS. 4-5 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may make reference to "convention," any such reference is merely for the purpose of providing context to the invention(s) of the instant disclosure and does not form any admission as to what constitutes the state of the art.

What is claimed is:

1. A method comprising:
    identifying one or more video frames in a video of a media asset;
    determining, from the one or more video frames, a plurality of points that constitutes a surface displayed in the one or more video frames of the video;
    determining a type associated with the surface;
    comparing the type associated with the surface with metadata associated with one or more advertisements;
    selecting, based on the type associated with the surface, an advertisement for display in the video; and
    inserting the advertisement on the one or more video frames comprising the surface in the video.

2. The method of claim 1, further comprising generating, based on the inserted advertisement, for display the advertisement overlaying the surface in the video.

3. The method of claim 1, wherein the plurality of points is within a threshold distance of a first point of the plurality of points.

4. The method of claim 1, further comprising:
    detecting a color value associated with a first point of the plurality of points;
    calculating a change in the color value between the first point and each point of the plurality of points; and
    determining, based on the calculating, that the plurality of points is within a threshold color value change of the first point.

5. The method of claim 1, further comprising:
    generating a data structure representing the surface displayed in the one or more video frames;
    and selecting the advertisement for display in the video based on the data structure.

6. The method of claim 5, further comprising:
    determining that the type associated with the surface is associated with a video object to be displayed on the surface; and
    modifying the data structure to display the advertisement with the video object.

7. The method of claim 5, further comprising:
    comparing coordinates of each point of the plurality of points with coordinates of other points with the plurality of points;
    determining, based on comparing the coordinates of each point of the plurality of points with the coordinates of other points with the plurality of points, a representation of a boundary of the surface; and
    storing coordinates of the representation of the boundary of the surface in the data structure.

8. The method of claim 7, further comprising:
    retrieving a plurality of video frames to be displayed in the video;
    comparing colors associated with the coordinates of the representation in the data structure with colors associated with corresponding coordinates within each video frame of the plurality of video frames;
    determining first video frames of the plurality of video frames, each of the first video frames having the colors associated with the corresponding coordinates that match the colors associated with the coordinates of the representation in the data structure;

determining second video frames of the plurality of video frames, each of the second video frames having the colors associated with the corresponding coordinates not matching the colors associated with the coordinates of the representation in the data structure;

adding the advertisement to the first video frames; and refraining from adding the advertisement to the second video frames.

9. The method of claim 1, wherein the type associated with the surface is determined based on color ranges and shapes for known surfaces.

10. The method of claim 1, further comprising:

for each video frame of the one or more video frames:
dividing the video frame into a plurality of concentric circular regions having progressively larger radii; and
identifying the plurality of points from one or more points within or on a perimeter of the plurality of concentric circular regions.

11. A system comprising:

display circuitry configured to display a video of a media asset; and control circuitry configured to:
identify one or more video frames in a video of a media asset;
determine, from the one or more video frames, a plurality of points that constitutes a surface displayed in the one or more video frames of the video;
determine a type associated with the surface;
compare the type associated with the surface with metadata associated with one or more advertisements;
select, based on the type associated with the surface, an advertisement for display in the video; and
insert the advertisement on the one or more video frames comprising the surface in the video.

12. The system of claim 11, further comprising generating, based on the inserted advertisement, for display the advertisement overlaying the surface in the video.

13. The system of claim 11, wherein the plurality of points is within a threshold distance of a first point of the plurality of points.

14. The system of claim 11, wherein the control circuitry is further configured to:
detect a color value associated with a first point of the plurality of points;
calculate a change in the color value between the first point and each point of the plurality of points; and
determine, based on the calculating, that the plurality of points is within a threshold color value change of the first point.

15. The system of claim 11, wherein the control circuitry is further configured to:
generate a data structure representing the surface displayed in the one or more video frames; and
select the advertisement for display in the video based on the data structure.

16. The system of claim 15, wherein the control circuitry is further configured to:
determine that the type associated with the surface is associated with a video object to be displayed on the surface; and
modify the data structure to display the advertisement with the video object.

17. The system of claim 15, wherein the control circuitry is further configured to:
compare coordinates of each point of the plurality of points with coordinates of other points with the plurality of points;
determine, based on comparing the coordinates of each point of the plurality of points with the coordinates of other points with the plurality of points, a representation of a boundary of the surface; and
storing coordinates of the representation of the boundary of the surface in the data structure.

18. The system of claim 17, wherein the control circuitry is further configured to:
retrieve a plurality of video frames to be displayed in the video;
compare colors associated with the coordinates of the representation in the data structure with colors associated with corresponding coordinates within each video frame of the plurality of video frames;
determine first video frames of the plurality of video frames, each of the first video frames having the colors associated with the corresponding coordinates that match the colors associated with the coordinates of the representation in the data structure;
determine second video frames of the plurality of video frames, each of the second video frames having the colors associated with the corresponding coordinates not matching the colors associated with the coordinates of the representation in the data structure;
add the advertisement to the first video frames; and
refrain from adding the advertisement to the second video frames.

19. The system of claim 11, wherein the control circuitry is configured to determine the type associated with the surface based on color ranges and shapes for known surfaces.

20. The system of claim 11, wherein the control circuitry is further configured to:
for each video frame of the one or more video frames:
divide the video frame into a plurality of concentric circular regions having progressively larger radii; and
identify the plurality of points from one or more points within or on a perimeter of the plurality of concentric circular regions.

* * * * *